(12) United States Patent
Aberg et al.

(10) Patent No.: US 10,875,117 B2
(45) Date of Patent: Dec. 29, 2020

(54) ARC START

(71) Applicant: ESAB AB, Gothenburg (SE)

(72) Inventors: Per Aberg, Laxa (SE); Johan Toftling, Forsvik (SE); Mikael Pettersson, Gothenburg (SE); Jakob Lennartsson, Gothenburg (SE)

(73) Assignee: ESAB AB, Gothenburg (SE)

( * ) Notice: Subject to any disclaimer, the term of this patent is extended or adjusted under 35 U.S.C. 154(b) by 310 days.

(21) Appl. No.: 15/682,727

(22) Filed: Aug. 22, 2017

(65) Prior Publication Data

US 2018/0056424 A1    Mar. 1, 2018

Related U.S. Application Data

(60) Provisional application No. 62/383,764, filed on Sep. 6, 2016, provisional application No. 62/382,401, filed on Sep. 1, 2016.

(51) Int. Cl.
| | |
|---|---|
| *B23K 9/06* | (2006.01) |
| *B23K 9/067* | (2006.01) |
| *B23K 10/00* | (2006.01) |
| *B23K 9/095* | (2006.01) |

(52) U.S. Cl.
CPC ............ *B23K 9/067* (2013.01); *B23K 9/095* (2013.01); *B23K 9/0956* (2013.01); *B23K 10/006* (2013.01)

(58) Field of Classification Search
CPC ...... B23K 10/006; B23K 9/067; B23K 9/095; B23K 9/0956
USPC ...... 219/130.1–130.51, 136, 137 R, 137 PW, 219/137.2, 137.7
See application file for complete search history.

(56) References Cited

U.S. PATENT DOCUMENTS

| | | | | |
|---|---|---|---|---|
| 5,168,144 A | * | 12/1992 | Hongu | ............... B23K 9/067 219/137.71 |
| 6,023,046 A | | 2/2000 | Holverson et al. | |
| 7,820,943 B2 | | 10/2010 | Beistle et al. | |
| 2008/0047942 A1 | * | 2/2008 | Laabs | ............... B23K 9/0956 219/130.5 |
| 2011/0168680 A1 | | 7/2011 | Holzhauer | |
| 2013/0264322 A1 | | 10/2013 | Bornemann et al. | |

(Continued)

FOREIGN PATENT DOCUMENTS

| | | |
|---|---|---|
| CN | 104014904 A | 9/2014 |
| CN | 104968465 A | 10/2015 |

(Continued)

OTHER PUBLICATIONS

International Search Report and Written Opinion from PCT/IB2017/055091 dated Jan. 25, 2018.

(Continued)

*Primary Examiner* — Sang Y Paik
(74) *Attorney, Agent, or Firm* — Edell, Shapiro & Finnan, LLC

(57) ABSTRACT

Various embodiments may be generally directed to a welding system that can adjust parameters of a welding process that is restarted after an interruption. The adjusted parameters can account for the temperature of an electrode, parent material, and/or weld pool which may change during the interruption. The adjusted parameters can be optimized based on these temperatures to enhance the quality and reliability of the weld as it restarts.

11 Claims, 2 Drawing Sheets

(56) References Cited

U.S. PATENT DOCUMENTS

| | | | |
|---|---|---|---|
| 2014/0042138 A1* | 2/2014 | Matthews | B23K 9/1093 |
| | | | 219/130.21 |
| 2014/0175072 A1* | 6/2014 | Hutchison | B23K 9/1093 |
| | | | 219/130.1 |
| 2014/0217077 A1* | 8/2014 | Davidson | B23K 9/173 |
| | | | 219/130.33 |
| 2016/0008914 A1 | 1/2016 | Okita et al. | |
| 2017/0165779 A1* | 6/2017 | Barhorst | B23K 9/1093 |

FOREIGN PATENT DOCUMENTS

| | | |
|---|---|---|
| CN | 107262879 A | 10/2017 |
| EP | 3228412 A1 | 10/2017 |
| WO | 0006335 A1 | 2/2000 |

OTHER PUBLICATIONS

Office Action for Chinese Application for Invention No. 201780051940.5 dated Apr. 13, 2020, with English translation, 19 pages.

Examination Report No. 1 for Australian Patent Application No. 2017318639 dated Oct. 12, 2019, 2 pages.

Office Action for Canadian Patent Application No. 3,033,839 dated Feb. 17, 2020, 5 pages.

\* cited by examiner

ARC START

CROSS-REFERENCE TO RELATED APPLICATIONS

This application claims the benefit of U.S. Provisional Application No. 62/383,764, filed on Sep. 6, 2016, and U.S. Provisional Application No. 62/382,401, filed on Sep. 1, 2016, the disclosures of which are incorporated by reference herein in their entireties.

TECHNICAL FIELD

The present embodiments are related to power supplies for welding type power, that is, power generally used for welding, cutting, or heating.

BACKGROUND

Often, short interruptions may be deliberately introduced into the welding process. For example, during a manual metal arc welding (MMA) process, a welder may deliberately introduce a short interruption in the welding process to allow the weld pool or puddle to cool down. The temperature of the electrode and parent material may change during the interruption. When the welding process restarts, the electrode and parent material may be hot or cool, depending on the length of the interruption. Many conventional welding systems and processes fail to account for changes to the temperatures of the electrodes and parent material caused by such interruptions when restarting the welding process. Consequently, the quality and reliability of a weld can suffer when the welding process restarts without accounting for changes to the temperatures of the electrodes and parent material.

It is with respect to these and other considerations that the present disclosure is provided.

SUMMARY OF THE INVENTION

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments may be generally directed to a welding system that can adjust parameters of a welding process that is restarted after an interruption. The adjusted parameters can account for the temperature of an electrode, parent material, and/or weld pool which may change during the interruption. The adjusted parameters can be optimized based on these temperatures to enhance the quality and reliability of the weld as it restarts.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DESCRIPTION OF EMBODIMENTS

Figure 1:
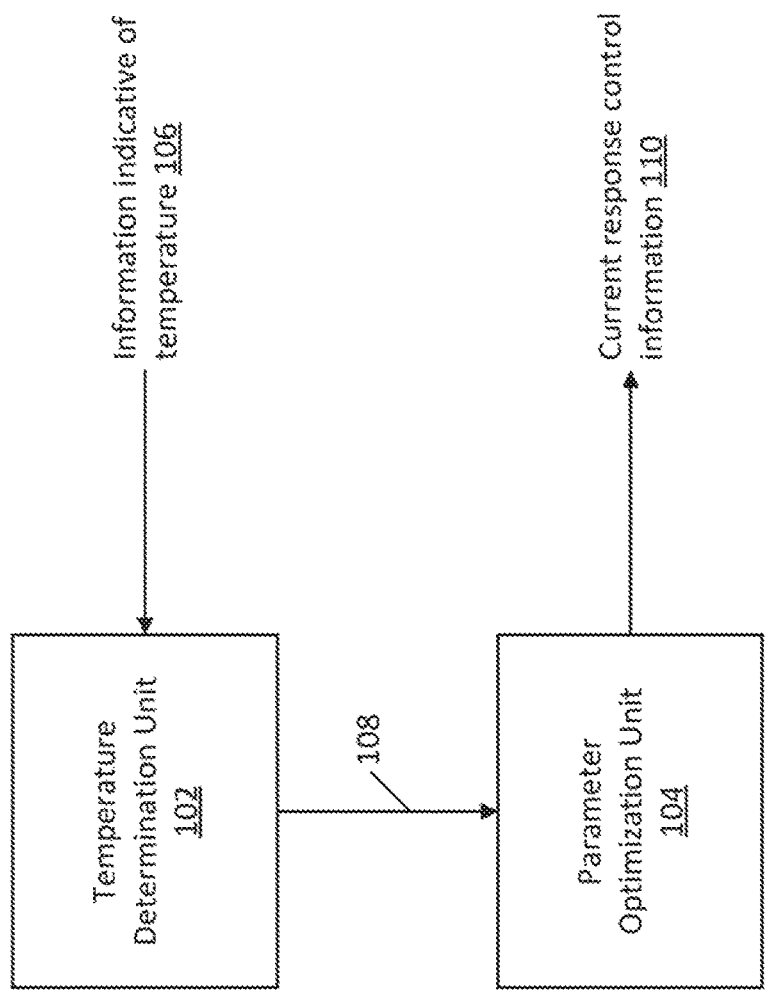
FIG. 1 illustrates a control module of a welding system according to an embodiment of the present invention.

Various embodiments may be generally directed to a welding system that can adjust parameters of a welding process that is restarted after an interruption. The adjusted parameters can account for the temperature of an electrode, parent material, and/or weld pool which may change during the interruption. The adjusted parameters can be optimized based on these temperatures to enhance the quality and reliability of the weld as it restarts.

Often, for many different types of welding processes, short interruptions may be introduced during the welding process. For example, a welder may deliberately introduce a short interruption in the welding process to allow the weld pool or puddle to cool down. Short interruptions are often introduced during manual metal arc welding (MMA) for example.

Depending on the length of time of the interruption, the temperature of the electrode and/or the workpiece/parent material may change substantially. For example, the temperature of the electrode and parent material may cool off significantly during a relatively long interruption. For shorter interruptions, the temperature of the electrode and parent material may cool off insignificantly and may remain very warm or hot. Further, when the welding process is continued—for example, when the welder restrikes the arc—the electrode may still be warmer than the electrode when the welding process began (i.e., when the initial arc was ignited).

The quality and integrity of the weld can be adversely affected when a welding process is continued after an interruption. For example, the current and/or current response provided when the welding process is continued may be poorly suited for the temperature of the electrode and parent material. If the current and/or current response fails to take into account the temperature of the electrode and/or parent material, then the electrode, for example, can freeze or become welded or stuck to the parent material, and/or the quality of the weld can suffer.

Further, each time a welder directs the movement of an electrode so that it touches the workpiece in order to ignite the arc (e.g., during an MMA welding process), contact bouncing can occur. This contact bouncing can cause a welding power supply to deliver enough power during a period of time without contact (e.g., due to the bouncing/as a reaction to the bouncing) to produce a small amount of molten material. The small portion of molten material can in turn create a small weld when there is a subsequent contact again (e.g., as a consequence of the bouncing) since the small amount of molten material can solidify quickly. Generally, the creation of this small weld as introduced by contact bouncing is not desirable.

To mitigate production of this small weld due to contact bouncing, two approaches can be used. In a first approach, a very high current rise can be provided during a first period when there is no contact as part of an attempt to avoid a new short circuit that can freeze the electrode. If a high current is provided, then enough heat may be provided (e.g., to avoid freezing) before a possible short circuit can occur.

In a second approach, the current can be controlled so as to rise slowly for example when the bouncing has ceased or the delivered power during a period of open circuit will not create enough molten material to freeze the electrode.

Either approach or a combination of the first and second approaches can be used as part of the techniques described herein. The use of a combination of both approaches can be implemented based on whether the electrode is relatively warmer or relatively cooler. As a result, the techniques described herein can reduce the risk of freezing the electrode during a start attempt. Further, a secondary advantage of the techniques described herein is that a welder can continue to focus on welding without losing focus or having to worry about freezing or igniting the arc.

FIG. 1 illustrates a portion of a control module 100 of a welding system that can adjust a provided current in response to a welding process being continued after an interruption. In particular, the control module 100 can adjust a current response based on a temperature of an electrode and/or parent material to ensure a high quality weld while reducing the likelihood of the electrode freezing. In various embodiments, the control module 100 can be part of a welding system used for MMA welding.

As shown in FIG. 1, the control module 100 can include a temperature determination module 102 and a parameter optimization module 104. The temperature determination module 102 can determine or estimate a temperature of an electrode and/or a temperature of parent material being welded. As shown in FIG. 1, the temperature determination module 102 can receive information indicative of a temperature of the electrode and/or parent material 106. The information 106 can comprise an indication of the amount of time a welding process has been interrupted. For example, the information 106 can be the amount of time that has elapsed since the welding system has provided a weld current, the amount of time an arc has been extinguished, or some other measure of time indicative of how long an electrode and/or parent material have been cooling off.

The temperature determination module 102 can use any received timing information 106 as an indication of the temperature of the electrode and/or parent material. For example, the temperature determination module 102 can determine or estimate that the temperature is lower for an electrode that has been used in a welding process that has been interrupted for a relatively longer period of time than an electrode that has been used in a welding process that has been interrupted for a relatively shorter period of time. Accordingly, the information 106 can be a measure of the time since the last weld or arc for example.

Alternatively, or in addition thereto, the information 106 can include other indicators of the temperature of the electrode and/or parent material. As an example, the information 106 can include an actual measurement of the temperature of the electrode and/or parent material. The information 106 could include an actual measurement of temperature of an area or object in close proximity to the electrode and/or the parent material. Under any scenario, the temperature determination module 102 can use the information 106 to determine or estimate an approximate temperature of an electrode and/or parent material being welded.

The temperature determination module 102 can subsequently categorize the temperature—for example, an electrode can be considered to be "warm" or "cool." The temperature determination module 102 is not limited to categorizing the temperature in a binary fashion (i.e., between two categories) and can categorize the temperature into one of any number of possible categories. For example, the temperature determination module 102 can have ten different temperature categories and can determine which of the ten different categories an electrode falls into based on an actual temperature measurement or a measurement of time since a last weld.

The temperature determination module 102 can use one or more timing thresholds to categorize the electrode and/or the parent material by temperature. Any number of temperature categories and timing thresholds can be used. As an example, two categories can be established—a "warm" electrode or a "cool" electrode—and a single timing threshold can be used. The timing threshold can be compared to timing information provided by the information 106 to determine if an electrode is warm or cool. For example, a timing threshold of 2 seconds can be established such that if the time since the last weld (as indicated by the information 106) is greater than 2 seconds, then the temperature determination module 102 can determine that the electrode is cool. Alternatively, if the time since the last weld (as indicated by the information 106) is less than 2 seconds, then the temperature determination module 102 can determine that the electrode is warm. In this way, any number of categories and thresholds can be established and used for determining a temperature of an electrode and/or parent material.

The temperature determination module 102 can provide a signal 108 to the parameter optimization module 104 based on any determined or estimated temperature made by the temperature determination module 102. The signal 108 can include information indicating how warm or cool an electrode and/or parent material may be. For example, the signal 108 can indicate the electrode and/or parent material is "warm" or "cool" or can indicate the electrode and/or parent material are within any number of determined temperature categories (e.g., fall into one of ten different possible temperature categories).

The parameter optimization module 104 can adjust one or more parameters of the welding system based on the received information 108 from the temperature determination module 102. Based on whether the electrode and/or parent material are "warm" or "cool" (or fall into one of any number of possible temperature categories), the parameter optimization module 104 can adjust one or more operational parameters to improve the welding process when the welding process is restarted.

The output current (and/or the current response) can be a parameter than can be adjusted by the parameter optimization module 104. A number of parameters related to the output current/current response can be adjusted or modified by the parameter optimization module 104. The parameters can be adjusted in any number of steps (e.g., over many steps to reach a set level or over only a few steps to reach the set level) and over any period of time.

A first parameter can be a rise time or a rise time constant (or ramp up time). The rise time can be varied based on determined temperature. As an example, for a determined "warm" electrode, the rise time constant can be 60 milliseconds (ms). For a determined "cool" electrode, the rise time constant can be 150 ms. Accordingly, the rise time can be shorter for a "warm" electrode compared to the rise time for a "cool" electrode.

A second parameter can be a current level. The current level can be varied based on determined temperature. As an example, for a determined "warm" electrode, the current level can be set to the following:

$$\text{Minimum of } [3*I_{ref}, I_{ref}+300 \text{ A}] \tag{1}$$

where Iref is a predetermined set current value. For a determined "cool" electrode, the current level can be set to the following:

Minimum of [2*Iref, Iref+150 A] (2).

Accordingly, the current level can be set to be higher for a "warm" electrode compared to the current level for a "cool" electrode and then used as the welding process restarts. Overall, the rise time and current level adjustments made by the parameter optimization module 104 can generally cause the output current to rise faster to a higher level for an electrode having a relatively higher temperature. Further, in (1) and (2) above, the current level can be a target level for an arc stabilizing pulse. Additionally, the current level in combination with a time constant can define a rate of a rise in the current.

A third parameter can be a time delay between contact and current rise. A time delay between contact and current rise can reduce the risk of a contact bounce that disturbs the welding process and quality. The time delay can be measured from a time when the electrode contacts the workpiece to a start of the current increase. The time delay can be different for a "warm" electrode and "cool" electrode or can be the same. As an example, the time delay can be set to be 50 ms for both a "warm" and a "cool" electrode.

A fourth parameter can be a ramp up filter coefficient. The ramp up filter coefficient can be applied to the ramp up of the current level. The ramp up filter coefficient can be varied based on determined temperature. As an example, for a determined "warm" electrode, the ramp up filter coefficient can be set to 0.980174952018632. For a determined "cool" electrode, the ramp up filter coefficient can be set to 0.996867645107823.

Overall, the parameter optimization module 104 can set one or more parameters to make the current rise faster for a "warm" electrode as compared to a "cool" electrode. This can improve the weld quality and can prevent freezing. For example, a warmer electrode generally has a higher tendency of "forming" its surface to the cold parent material and freezing. By using the faster rise of the current for a warm electrode, the tendency for freezing can be counteracted and mitigated.

The parameter optimization module 104 can generate a signal 110 to indicate the one or more parameters to be adjusted or optimized. The signal 110 can comprise current response control information for example. The signal 110 can be provided to other components of a welding system associated with the control module 100 to implement the adjustments to the current specified in the signal 110.

The temperature determination module 102 and the parameter optimization module 104 can be implemented in hardware, software, or any combination thereof.

Figure 2:
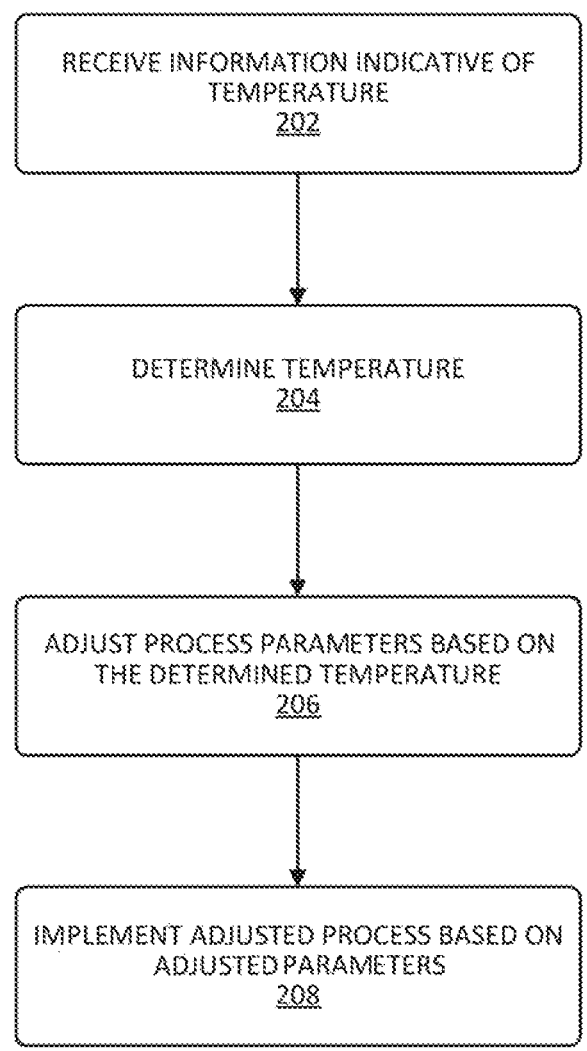
FIG. 2 illustrates an example of a logic flow that may be implemented by the control module depicted in FIG. 1 according to an embodiment of the present invention.

FIG. 2 illustrates an example of a logic flow 200 that may be representative of the implementation of one or more of the disclosed techniques for adjusting process control parameters based on temperature. The logic flow 200 may be representative of operations that may be performed by the control module 100 depicted in FIG. 1.

At 202, information indicative of a temperature can be received. The information can be received by a component of a welding system such as a control module of a welding system. The temperature information can be related to a temperature of an electrode, a temperature of parent material, and/or a temperature of a weld pool or puddle. The information can be a direct or indirect measurement of temperature. For example, the information can be an actual measurement of the temperature of the electrode. The information can be a measurement of time. For example, the information can be a measure of time since a last weld (e.g., a measure of an interruption to a weld process, a time since an arc was active, a time since an output current was provided, etc.).

At 204, a determined or estimated temperature can be determined. The determined or estimated temperature can be the temperature of an electrode, a temperature of parent material, and/or a temperature of a weld pool or puddle. The temperature can be determined in any number of ways. As an example, the received information indicative of temperature can be compared to one or more thresholds to determine a category of temperature (e.g., along a predetermined temperature scale). Two or more categories of temperature can be used and one or more thresholds can be used. As an example, a single threshold can be used to determine if an electrode is "warm" or "cool". The threshold can be a time threshold so that any amount of time (as indicated based on information received at 202) over the time threshold results in the electrode being determined to be cool, while any amount of time less than the threshold results in the electrode being determined to be warm.

At 206, welding process parameters can be adjusted based on the temperature determination made at 204. Any number of welding process parameters can be adjusted. As an example, an output current and/or an output current response can be adjusted by modifying one or more welding process parameters. Parameters that may be adjusted to vary the response time can include a rise time constant, a current level, a delay from contact to current increase, and a ramp up filter coefficient. Parameters can vary for each possible temperature category.

At 208, the welding process can be adjusted based on the modified process parameters. The welding process can be adjusted when the welding process begins again after the interruption. The modified process parameters can be provided to any number of components within a welding system to adjust the welding process.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Thus, the claims set forth below should be construed in view of the full breadth and spirit of the present disclosure as described herein.

What is claimed is:

1. A manual metal arc (MMA) welding system, comprising:

a temperature determination module to determine, from among a plurality of possible temperature categories, a temperature category of an MMA electrode during an interruption to an MMA welding process on a workpiece based on a comparison of information indicative of a duration of the interruption to one or more timing thresholds; and a parameter optimization module to set one or more current parameters of the MMA welding process based on the temperature category of the MMA electrode determined by the temperature determination module, wherein the one or more current parameters includes a rise time, a rise time constant, or a ramp up time of an output current subsequent to the MMA electrode contacting the workpiece after the interruption.

2. The MMA welding system of claim 1, wherein the duration of the interruption comprises an amount of time since a last weld.

3. The MMA welding system of claim 1, wherein the duration of the interruption comprises an amount of time since an output current was provided.

4. The MMA welding system of claim 1, wherein the plurality of temperature categories includes a warm electrode category and a cool electrode category.

5. The MMA welding system of claim 1, wherein the one or more current parameters further include a time delay measured from a time when the MMA electrode contacts the workpiece to a start of a current increase, wherein a duration of the time delay is a function of the temperature category of the MMA electrode.

6. The MMA welding system of claim 1, wherein the one or more current parameters further include a ramp up filter coefficient for the output current.

7. The MMA welding system of claim 1, wherein the one or more current parameters further include a current level for the output current.

8. A manual metal arc (MMA) welding method, comprising:

receiving information indicative of a duration of an interruption to a welding process involving an MMA electrode and a workpiece;

determining, from among a plurality of possible temperature categories, a temperature category of the MMA electrode based on a comparison of the received information indicative of the duration of the interruption to one or more timing thresholds;

setting one or more current parameters of the welding process based on the determined temperature category of the MMA electrode, the one or more current parameters including a rise time, a rise time constant, or a ramp up time of an output current subsequent to the MMA electrode contacting the workpiece after the interruption; and providing the one or more current parameters to one or more components of a welding system to adjust operation of the welding system for the welding process.

9. The MMA welding method of claim 8, wherein the one or more current parameters further include a time delay measured from a time when the MMA electrode contacts the workpiece to a start of a current increase, wherein a duration of the time delay is a function of the temperature category of the MMA electrode.

10. The MMA welding method of claim 8, wherein the one or more current parameters further include a ramp up filter coefficient for the output current.

11. The MMA welding method of claim 8, wherein the one or more current parameters include a current level of the output current.

* * * * *